United States Patent Office 3,775,484
Patented Nov. 27, 1973

3,775,484
PROCESS FOR PREPARING METAL SALTS OF DITHIOLBUTANEDIOLS
Joseph P. Ciaudelli, Ramsey, N.J., assignor to Avon Products, Inc.
No Drawing. Continuation-in-part of application Ser. No. 124,529 Mar. 15, 1971. This application July 21, 1972, Ser. No. 273,796
Int. Cl. C07c *149/18*
U.S. Cl. 260—609 R  10 Claims

---

ABSTRACT OF THE DISCLOSURE

The method of making a metal salt of a 1,4-dithiol-2,3-butanediol comprising first forming said diol by reacting butane dioxide with hydrogen sulfide in a $C_3$–$C_5$ alkanol solvent therefor in the presence of a catalyst, adding to the reaction mass after the diol is formed a water-soluble metal compound capable of reacting with said diol to form a salt insoluble in said solvent, and separating the precipitated 1,4-dithiol-2,3-butanediol salt formed.

---

CROSS-REFERENCE TO RELATED APPLICATION

This application is a continuation-in-part of copending application Ser. No. 124,529, filed Mar. 15, 1971.

BACKGROUND OF THE INVENTION

The parent application relates to an improved process for the manufacture of certain butanediols, which process makes the preparation of such diols economically feasible. Also disclosed therein is the further reaction of the isolated butanediol with a metal compound to form metal salts of the diol. This process of making the salt, though vastly superior to prior processes, is not entirely suitable. The reasons are that it requires first isolating the diol, as by distillation, and then purifying the diol to remove any by-products which co-distill with the diol before reaction with the metal compound in order to have a pure salt. These additional steps are costly and time consuming and require more equipment.

SUMMARY OF THE INVENTION

It has now been found that metal salts of 1,4-dithiol-2,3-butanediols can be produced in high yield at atmospheric pressure without need for initially isolating and purifying the diols.

Briefly stated, the present invention comprises the method of making a metal salt of a 1,4-dithiol-2,3-butanediol comprising first forming said diol by reacting butadiene dioxide with hydrogen sulfide in a $C_3$–$C_5$ alkanol solvent therefor in which the desired salt is insoluble in the presence of a catalyst while maintaining the temperature in the range of from about 15° to 40° C., the ratio of said solvent to said dioxide, by volume, being at least about 5:1, adding to the reaction mass a water-soluble metal compound capable of reacting with said diol to form a salt of said diol insoluble in said solvent, and separating the precipitated 1,4-dithiol-2,3-butanediol salt formed.

DETAILED DESCRIPTION

The critical aspects of the instant process are control of the temperature, the alkanol used, and the ratio thereof. All must be within the ambits hereinafter set forth in order to obtain the 1,4-dithiol-2,3-butanediol salts in high yields.

With respect to the reaction temperature, it must be maintained below about 40° C., since temperatures thereabove tend to cause polymerization, thereby limiting the yield of dithiolbutanediol salt desired. While the lower limits of the temperature range are not as critical, for efficient reaction it must be at least about 15° C., with the preferred temperature range being 25°–30° C. Since the reaction between the butadiene dioxide and hydrogen sulfide is exothermic, the reaction mixture must either be cooled or the reaction carried out at a rate to maintain the temperature within the range noted. It is preferred to cool the reaction mixture in order to have the reaction proceed more rapidly.

It has also been found that the ratio of alkanol to butadiene oxide and alkanol used is critical. There must be at least 5 parts by volume of the solvent for each part by volume of the dioxide. In fact, it is preferred to have at least about 12 parts by volume of the alkanol for each part of the dioxide. The upper limit in this volume ratio is not critical and is governed simply by economic commercial conditions. That is to say, there is no need to exceed about 20 parts by volume of the alkanol for each part by volume of the dioxide, since this only increases problems due to the handling of large volumes of alkanol, requires the use of larger equipment, and the like. The lower limit is, however, critical, in that under the reaction temperature conditions volume ratios much below 5:1, as noted above, will not give the desired product.

The alkanol must be a $C_3$–$C_5$ alkanol and be inert in that it will not take part in the reaction. The salt formed must be insoluble therein but it must be a solvent for the butadiene dioxide, hydrogen sulfide and diol. Specific examples are isopropanol, propanol, butanol, pentanol, and mixtures thereof.

As to the reactants, the butadiene dioxide and hydrogen sulfide used are those commercially available.

The preferred metal compounds are the alkaline earth metal and alkali metal hydroxides such as sodium, potassium and calcium hydroxide. Also suitable are zinc sulfate, zinc nitrate, lead nitrate, and the like and the metal esters such as lead acetate, lead formate, zinc lactate, and the like. Any metal compound which will form a salt when reacted with the diol and which is soluble in water can be used. The metal compound need not be completely soluble in water.

As to proportions, it is preferred to use stoichiometric amounts, that is, 2 mols of hydrogen sulfide for each mol of the butadiene dioxide and a stoichiometric amount of the metal compound. If desired, a molar excess of hydrogen sulfide can be used but is not required for optimum results. The alkanol is used in the amounts set forth above.

As to the catalyst used, it is a basic catalyst, preferably an aryltrialkylammonium hydroxide or a sodium sulfhydrate. Examples of the suitable hydroxides are the benzyltrimethylammonium hydroxide and benzyltriethylammonium hydroxide. Catalysts used in the reaction of monoepoxides and hydrogen sulfide can also generally be used. Examples are triethylenetetramine; piperidine; cyclohexylamine; n-butylamine; sodium hydrosulfide; dialkylamines such as diethylamine and dimethylamine; trialkylamines, such as trimethylamine, triethylamine, tri-n-propylamine, tri-n-butylamine; and mixtures thereof. The amount of catalyst used can vary widely dependent, for example, upon the speed of reaction desired. As little as 5% by weight, based on the weight of butadiene dioxide, is sufficient.

In carrying out the reaction, it is preferred to first saturate the alkanol with hydrogen sulfide and then to incrementally add the butadiene dioxide thereto while maintaining the temperature within the range of about 15°–40° C. as by cooling the reaction vessel. The addition rate of the butadiene dioxide can be as rapid as the efficiency of cooling permits the temperature to be maintained within the cited range. Since the reaction is an exothermic one, termination of the reaction is readily determined at that point where the temperature drops in the reaction vessel. While the reverse addition reaction of adding hydrogen sulfide into a solution of the butadiene dioxide can be used, somewhat lower yields are obtained. Thus, it is preferred to first form the solution of the hydrogen sulfide in the alkanol with the catalyst and to add the butadiene dioxide thereto. After the reaction is completed and the diol formed, the metal compound is added to the reaction mass in the form of an aqueous solution, preferably with stirring, and the autogenous reaction takes place with formation of the salt which precipitates out of the mass. As used herein the term "autogenous reaction" means that the reaction takes place at ambient temperature and pressure and without the need of any catalyst.

Use of the $C_3$ to $C_5$ alkanols results in keeping the by-products in solution and avoids contamination of the salt which precipitates. The solid salt is removed from the reaction mass, as by filtration, and is preferably washed with additional $C_3$ to $C_5$ solvent to insure removal of all impurities before being dried.

The 1,4-dithiolbutanediol salts formed can be used to wave hair or to depilate by being applied to hair-containing skin.

The invention will be further illustrated in connection with the following examples which are set forth for purposes of illustration only and in which proportions are by weight unless expressly stated to the contrary.

Example 1

Four hundred cc. of isopropanol and 5.4 cc. (40% sol. in isopropanol) of N-benzyltrimethylammonium hydroxide are placed in a 3-neck reaction vessel fitted with a gas inlet tube connected to a hydrogen sulfide cylinder, a dropping funnel, a condenser fitted with a gas outlet tube for excess hydrogen sulfide gas, and a magnetic stirrer. The hydrogen sulfide is bubbled in the isopropanol solution for one hour after which 50 cc. (55 grams) of butadiene dioxide in 50 cc. of methanol are added dropwise over 3–3.5 hour period. The stirring of the mixture and the addition of hydrogen sulfide are continuous during this time. Also, the temperature of the reaction mixture is maintained at 30–32° during the addition of the butadiene dioxide. After the addition of the butadiene dioxide the hydrogen sulfide is bubbled in for an additional hour. After the temperature of the mixture decreases, nitrogen is bubbled in to remove the excess hydrogen sulfide in the reaction mixture.

To this reaction mass there is then added, with stirring, a stoichiometric amount of a 50% aqueous solution of sodium hydroxide. The disodium dithiothreitol tetrahydrate precipitates out as a white crystalline product. This product is removed from the reaction mass by filtration, washed with isopropanol, and dried in a vacuum oven at 30° C.

Example 2

The reaction vessel and conditions of Example 1 are used except that the hydrogen sulfide is bubbled into a solution of butadiene diepoxide and catalyst. Specifically, hydrogen sulfide is bubbled through a 8:1 solution (volume/weight) of isopropanol to butadiene diepoxide containing an 0.5 ml. of 40% isopropanolic benzyltrimethyl ammonium hydroxide over a three hour period. The temperature is maintained between 15–30° C. Addition of the sodium hydroxide solution, as set forth in Example 1, results in disodium salt formation.

Example 3

The reaction vessel and conditions of Example 1 are used except that sodium sulfhydrate is used as the catalyst.

To 200 cc. isopropanol is added 1.0 gram of sodium sulfhydrate (NaSH—$3H_2O$). This solution is saturated with hydrogen sulfide and then butadiene diepoxide solution [0.258 mole (22.2 g.) in 20 ml. isopropanol] is added over a two hour period dropwise. The temperature is maintained between 22–30° by external water bath. Hydrogen sulfide is added for an additional three hours after addition of butadiene diepoxide. The reaction is then sealed and permitted to stand overnight.

Example 4

A series of reactions are run following the procedure of Example 1 except that there is substituted for the isopropanol used therein, separately and in turn, an equal volume of each of the following: propanol, butanol, pentanol, mixture of isopropanol and propanol, mixture of propanol and butanol, and mixture of propanol and pentanol. In each case, high yields of the disodium salt of 1,4-dithiol-2,3-butanediol are obtained.

Example 5

A series of reactions is run following the procedure of Example 1 except that the sodium hydroxide used therein is replaced, separately and in turn, by an equivalent amount of calcium hydroxide, potassium hydroxide, lead formate, lead nitrate, lead acetate, zinc nitrate, zinc lactate, and zinc sulfate. In each case, the corresponding metal mercaptide is formed.

The instant invention is suitable for making the metal salts of dithiothreitol and dithioerythritol.

It will be understood that it is intended to cover all the changes and modifications of the examples of the invention herein chosen for the purpose of illustration which do not constitute departures from the spirit and scope of the invention.

What is claimed is:

1. The method of making a metal salt of 1,4-dithiol-2,3-butanediol comprising first forming said diol by reacting butadiene dioxide with hydrogen sulfide in a $C_3$–$C_5$ alkanol solvent therefor in which the desired salt is insoluble in the presence of an alkaline catalyst while maintaining the temperature in the range of from about 15° to 40° C., the ratio of said solvent to said dioxide, by volume, being at least about 5:1, adding to the reaction mass a water-soluble metal compound capable of reacting with said diol to form a salt of said diol insoluble in said solvent, and separating the precipitated 1,4-dithiol-2,3-butanediol salt formed.

2. The method of claim 1 wherein the solvent is first saturated with the hydrogen sulfide and the butadiene dioxide then incrementally added thereto.

3. The method of claim 2 wherein the ratio of solvent to dioxide is at least about 12:1 and the reaction temperature is from 25° to 30° C.

4. The method of claim 3 wherein the metal compound is an alkali metal or alkaline earth metal hydroxide and is added in a stoichiometric amount.

5. The method of claim 4 wherein the solvent is isopropanol and the metal compound is sodium hydroxide.

6. The method of claim 3 wherein the solvent is isopropanol and the metal compound is potassium hydroxide.

7. The method of making a metal salt of 1,4-dithiol-2,3-butanediol comprising saturating a $C_3$–$C_5$ alkanol solvent containing an alkaline catalyst with hydrogen sulfide, incrementally adding thereto butadiene dioxide while maintaining the temperature in the range of about 15° to 40° C. until the reaction is substantially completed and the diol formed, the ratio of said solvent to said dioxide being at least about 12:1 and the amount of butane dioxide added being about one mol for each two mols of the hydrogen sulfide, adding to the reaction mass a water-soluble metal compound capable of reacting with said diol to form a salt thereof insoluble in said solvent, and separating the precipitated 1,4-dithiol-2,3-butanediol salt formed.

8. The method of claim 7 wherein the metal compound is an alkali metal or alkaline earth metal hydroxide.

9. The method of claim 7 wherein the solvent is isopropanol and the metal compound is sodium hydroxide.

10. The method of claim 7 wherein the solvent is isopropanol and the metal compound is potassium hydroxide.

References Cited

UNITED STATES PATENTS 3,462,496　8/1969　Fletcher et al. ____ 260—609 D

OTHER REFERENCES

Umbach et al., "Anstrichimittel," 71 (1969), pp. 199–203.

ELBERT L. ROBERTS, Primary Examiner

D. R. PHILLIPS, Assistant Examiner

U.S. Cl. X.R.

8—161; 260—429.9, 435 R, 609 D; 424—71